United States Patent [19]

Belmond et al.

[11] Patent Number: 5,528,957

[45] Date of Patent: Jun. 25, 1996

[54] HAND LEVER PARKING BRAKE FOR MOTOR VEHICLE, HAVING REDUCED OPERATING FORCE REQUIRED OF THE USER

[75] Inventors: Jean-Marc Belmond; Philippe Ottolini, both of Saint-Die, France

[73] Assignee: Rockwell Body and Chassis Systems, France

[21] Appl. No.: 181,929

[22] Filed: Jan. 14, 1994

[30] Foreign Application Priority Data

Jan. 19, 1993 [FR] France .................................. 93 00483

[51] Int. Cl.$^6$ ................................................ B60T 7/08
[52] U.S. Cl. ........................................ 74/538; 74/501.5 R
[58] Field of Search .............................. 74/538, 501.5 R, 74/528, 529

[56] References Cited

U.S. PATENT DOCUMENTS

| | | | |
|---|---|---|---|
| 3,310,995 | 3/1967 | Buchwald | 74/538 X |
| 3,975,972 | 8/1976 | Muhleck | 74/529 X |
| 4,442,923 | 4/1984 | Watasuki et al. | 74/501.5 R X |
| 4,914,971 | 4/1990 | Hinkens et al. | 74/501.5 R X |

FOREIGN PATENT DOCUMENTS 4126647  4/1992  Japan ........................................ 74/538

*Primary Examiner*—Charles A. Marmor
*Assistant Examiner*—Mary Ann Battista

[57] ABSTRACT

Parking brake for vehicle, of the type comprising a lever (1) articulated onto a spindle (2) integral with a base (3) designed to be solidly attached with the chassis of the vehicle, which lever is connected to at least one actuation cable (7), and means for locking the lever in a predetermined angular position; the lever includes an element (9) for linkage with the cable, and the end of the base (3) contiguous to the articulation spindle of the lever is profiled so as to form a ramp (11) for limiting the displacement of the said linkage element during operations of the lever, this ramp being limited by a stop (11b) for retaining the lever in a raised brake actuation position and being positioned at the end of the base opposite the entry of the cable. This brake requires for its operation only a limited force from the user, less than the forces normally necessary on conventional brakes with toothed sectors and pawls.

6 Claims, 3 Drawing Sheets

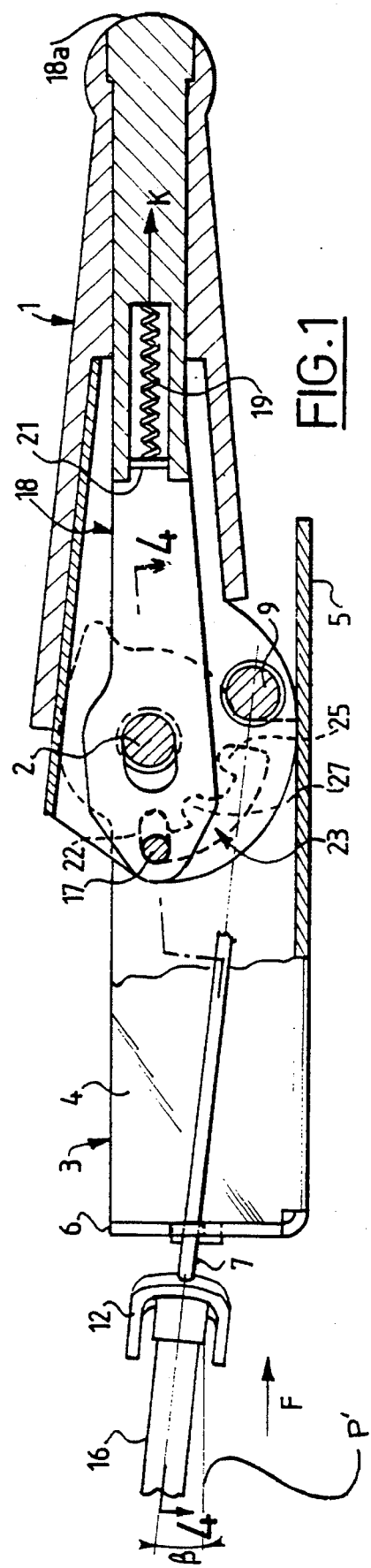
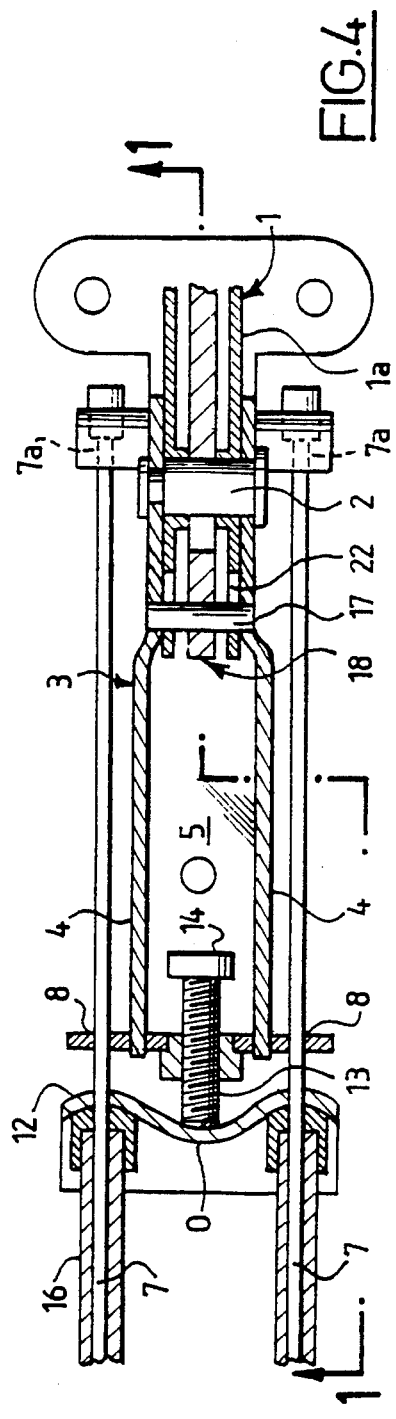

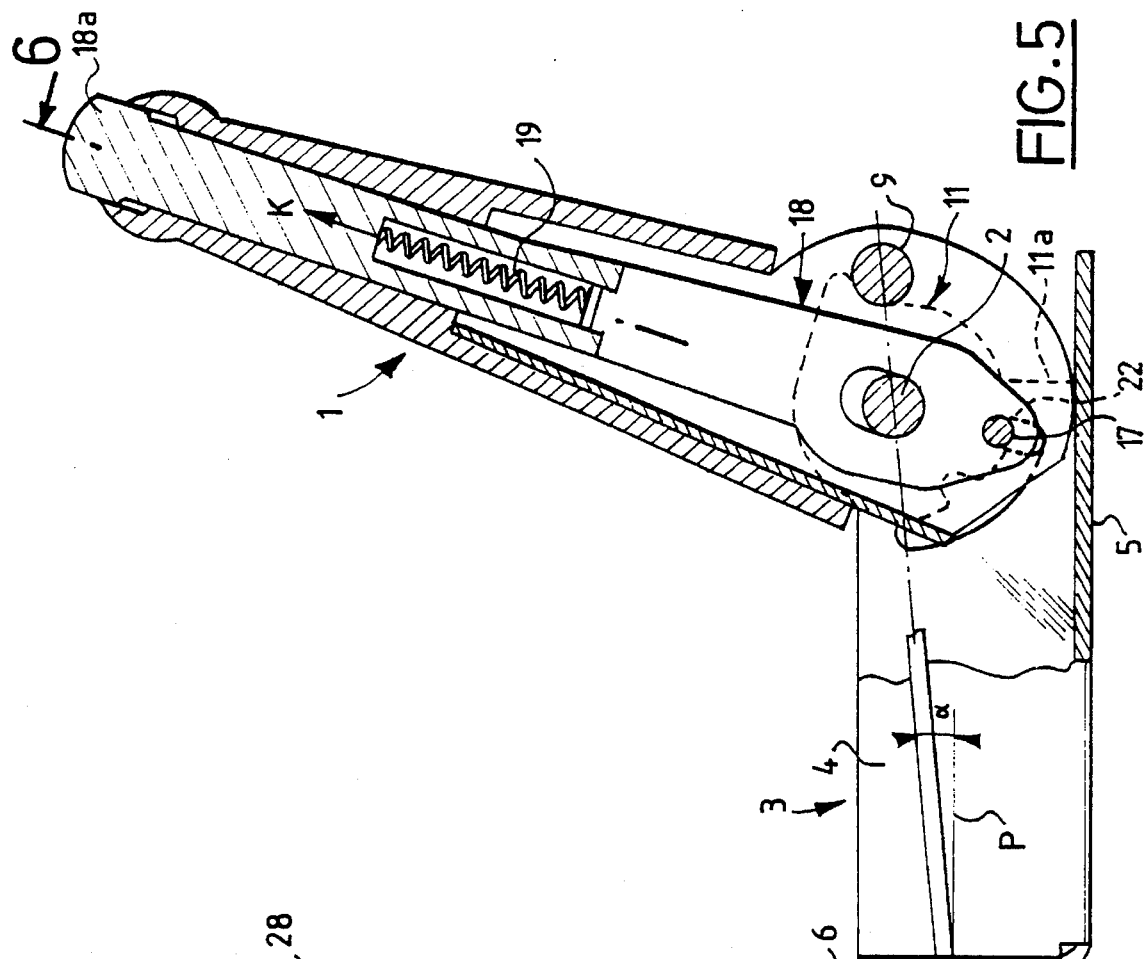
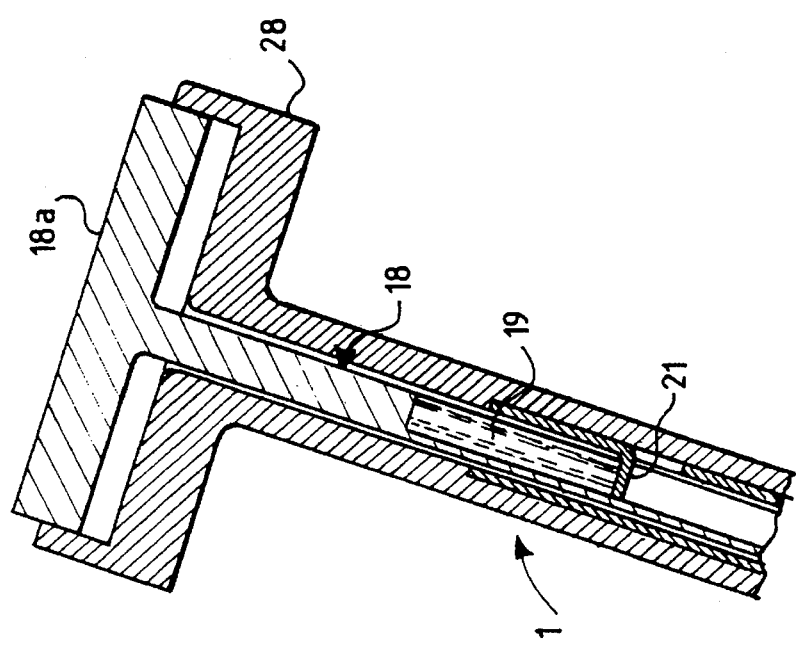

HAND LEVER PARKING BRAKE FOR MOTOR VEHICLE, HAVING REDUCED OPERATING FORCE REQUIRED OF THE USER

BACKGROUND OF THE INVENTION

The subject of the present invention is a parking brake for vehicle, of the type comprising a lever articulated onto a spindle integral with a base designed to be solidly attached with the chassis of the vehicle, which lever is connected to at-least one actuation cable, and means for locking the lever in a predetermined angular position.

It is known that vehicle parking brakes currently used generally include pawl and toothed sector systems. In cases of extreme use, the ergonomics of the control of these parking brakes is relatively unsatisfactory, because the force which must be developed at the lever is at least of the order of 35 to 40 daN to obtain adequate tension in the actuation cables.

Releasing the brake furthermore requires an additional discharging force on the part of the user, which force increases with the tension in the cables.

SUMMARY OF THE INVENTION

The object of the invention is to produce a parking brake whose control requires forces which are globally less than those hitherto required.

According to the invention, the lever includes an element for linkage with the end of the cable, and the end of the base contiguous to the articulation spindle of the lever is profiled so as to form a ramp for limiting the displacement of the said linkage element during operations of the lever, this ramp being limited by a stop for retaining the lever in a raised brake actuation position and being positioned at the end of the base opposite the entry of the cable, the articulation spindle being situated between this entry and the aforementioned linkage element.

According to one advantageous embodiment of the invention, in which the brake includes two cables arranged on each side of the base, the ends of these cables are fixed to the aforementioned transverse linkage element and means for adjusting the tension of the cables are provided, such as a compensator combined with a screw-nut system mounted on the base.

The cables are advantageously positioned on each side of the control by guide grooves made at the rear of the base. Such an arrangement of the cables makes it possible to operate the brake with forces less than those hitherto required.

According to one characteristic of the invention, the means for locking the lever in the actuated position comprise a spindle fixed to the end of a push rod slidingly mounted inside the lever and subjected to an elastic return stress, a cam for bearing this spindle, made in the base and oblong slots arranged in the lever to allow guidance and translation of the spindle during operations of the lever, the ends of the cam defining the rest and actuated positions of the lever, and the elastic return stress of the push bar tending to keep the said locking spindle applied on the cam.

Advantageously, the stop for retaining the lever in the actuated position is made such that, in this position, the cable forms an angle with the plane for fastening of the base onto the chassis, and that the direction of the force in the cable therefore creates a resultant drive torque on the lever.

BRIEF DESCRIPTION OF THE DRAWINGS

Other features and advantages of the invention will emerge during the description which follows, made with reference to the attached drawings which illustrate one embodiment thereof by way of non-limiting example.

FIG. 1 is a half-longitudinal section, half-partial elevation view, along 1—1 in FIG. 4, of one embodiment of the parking brake according to the invention, in the released position with the lever lowered.

FIG. 4 is a view in partial longitudinal section along 4—4 in FIG. 1.

FIG. 5 is a view similar to FIG. 1, showing the brake in the actuated position with the lever raised.

FIG. 6 is a view in partial longitudinal section of the lever along the direction 6 in FIG. 5.

DESCRIPTION OF THE PREFERRED EMBODIMENT(S)

Figure 2:
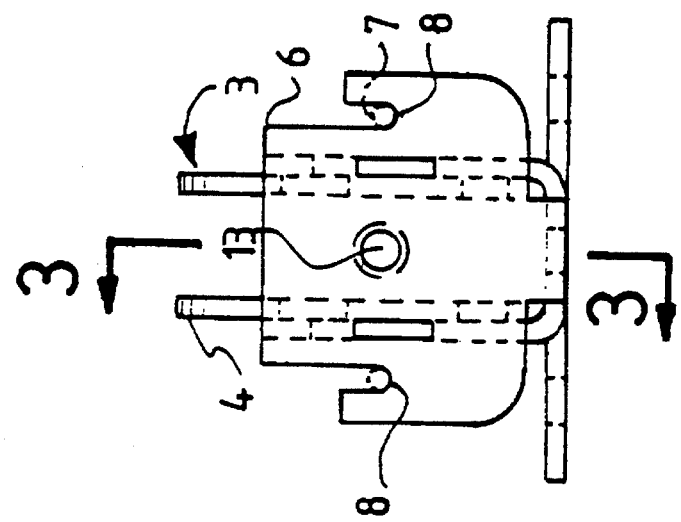
FIG. 2 is an end view in elevation along the arrow F in FIG. 1.
Figure 3:
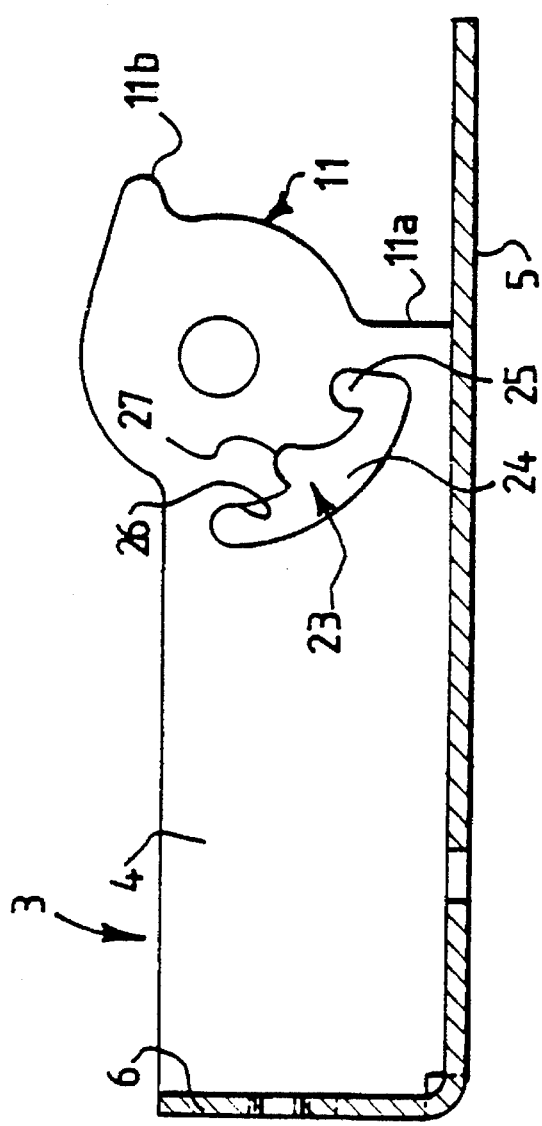
FIG. 3 is a view in longitudinal section with partial elevation of the base along 3—3 in FIG. 2.

The parking brake for a motor vehicle, represented in FIGS. 1 to 6, comprises a hollowed lever 1, articulated by one of its ends on a transverse spindle 2 mounted in a base 3. The latter consists of two parallel longitudinal walls 4 joined by a bottom 5 and by a transverse end wall 6, on the side of the arrival of two actuation cables 7.

The base 3 is designed to be solidly attached with the chassis (not shown) of the vehicle by means which are known per se. The two cables 7 are positioned on either side of the walls 4 of the base 3 and of the lever 1, passing through the guide grooves 8 formed in the wall 6. Their ends 7a are situated at the rear of the base 3, beyond the articulation spindle 2, and are fixed, in a manner which is known per se, to a transverse linkage spindle 9 integral with the lever 1, this spindle 9 being provided at that end of the latter which is articulated on the spindle 2.

The terminal part of the base 3, contiguous to the articulation spindle 2, that is to say, in the example shown, the ends of the longitudinal walls 4 opposite the transverse wall 6 for entry of the cables 7, are profiled so as to form a double ramp 11 capable of limiting the displacement of the linkage spindle 9 of the cables 7, during operations of the lever 1. Each ramp 11 thus has a substantially circular profile whose bottom end 11a, contiguous with the bottom 5 of the base 3, defines the rest position of the lever 1 (FIG. 1), whilst its opposite end 11b (FIG. 3) forms a stop retaining the lever 1 in the raised brake actuation position (FIG. 5). During operations of the lever 1, the linkage spindle 9 of the ends 7a of the cables 7, moves above the profiled ramps 11, tensioning or detensioning the cables 7, according to the direction of tilting of the lever 1.

The brake includes means for adjusting the tension in the cables 7, for example, in the embodiment shown, a compensator 12 through which the cables 7 are threaded before reaching the spindle 9 and a screw 13-nut 14 system. The screw 13 passes through the entry wall 6 and its end interacts with the compensator 12 in order to allow tension adjustment of the cables 7. These latter are housed in sheaths 16 terminating in the compensator 12, on which sheaths the latter acts as a stop whose position can be varied using the screw 13-nut 14 system.

The means for locking the lever 1 in the actuated position comprise a spindle 17 fixed to the end of a push bar 18 passed through by the spindle 2, which is slidingly mounted inside the lever 1 and subjected to an elastic return stress K. For this purpose the push bar 18 contains a longitudinal spring 19 which bears by one of its ends on a support 21 linked to the walls of the lever 1, and generates the said elastic return stress K in the longitudinal direction. Furthermore, a cam for sliding bearing of the spindle 17 is provided in the base 3, as well as oblong slots 22 arranged in the walls of the lever 1 to allow guidance and translation of the spindle 17 during operations of the lever. The aforementioned cam consists, in the embodiment described, of two identical profiles 23, each delimiting one of the sides of an opening 24 made in each wall 4, between the articulation spindle 2 of the lever 1 and the bottom 5. Each profile 23 includes a bottom end formed by a locking notch 25 receiving the spindle 17 of the push bar 18 when the lever 1 is in the raised actuated position (FIG. 5), a top end 26 forming a stop for the spindle 17 when the lever 1 is in the rest position (FIG. 1), and a notch or gap 27, made in the mid region of the cam 23. This gap 27 receives the locking spindle 17 in an intermediate position of actuation of the lever 1.

On the side opposite its spindle 2 for articulation on the base 3, the lever 1 is provided with a terminal manual grip handle 28, in which the end 18a of the push bar 18 can slide. This end 18a projects slightly from the handle 18 when the spring 19 holds the locking spindle 17, by virtue of its return force K, in one of its two possible housings 25 and 27 of the double cam 23. Moreover, the base 3 is fixed to the floor of the vehicle such that the actuation and operating forces are taken up by the structure of the vehicle.

Each stop 11b for retaining the lever 1 in the maximum actuation position is made such that, in this position (FIG. 5), the cables 7 form an angle α with the plane (P) of fastening of the base 3 onto the chassis. For this reason, the direction of the forces in the cables 7 passes slightly above the geometrical axis of articulation of the spindle 2, which creates on the lever 1 a resultant drive torque, which has the effect of keeping permanent contact between the spindle 9 and the terminal stops 11b.

The rest position of the lever 1 is fixed, as already indicated, by the end profile 11a of the ramps 11 forming a stop, when the spindle 9 of the lever 1 is in contact with these profiles 11a (FIG. 1).

The parking brake which has just been described is operated in the following manner.

With the lever 1 in the bottom rest position (FIG. 1) the cables 7 form an angle β with a plane P' parallel to the plane of fastening of the base 3 on the chassis. The rest position of the lever 1 is ensured by the contact of the cable-holder spindle 9 with the stop profiles 11a of the base 3. The end spindle 17 of the push bar 18 is positioned in abutment on the ends 26 of the cams 23, the end 18a of the push bar 18 being flush with the grip handle 28, as shown in FIG. 1. The spindle 17 is not engaged in the slots 22, and therefore holds the spring 19 in the compressed state.

During the actuation operation, the lever 1 drives the push bar 18 in relative rotation with respect to the base 3, about the articulation spindle 2. The cables 7 are angularly displaced about a point O (FIG. 4) situated at the level of the entry wall 6 of the base 3, on either side of the control, such that the distance separating these cables from the spindle 2 decreases as the linkage axis 9 turns about the spindle 2. At the start of the actuation operation, the spindle 17 of the push bar 18 slides on the terminal profiles 26 then translates in the oblong slots 22 of the lever 1 under the effect of the elastic return force K of the spring 19, when the intermediate notches 27 are reached. If the operation of the brake is then interrupted, the spindle 17 immobilizes the lever 1 with respect to the base 3, in this intermediate angular position between the rest position and the maximum actuation position, such that the cables 7 remain held in a first state of tension, which is generally sufficient in most cases.

If the user continues his operation of lifting the lever 1, the end spindle 17 of the push bar 18 slides over the second part of the cams 23, that is to say on the ramp separating the notches 27 from the terminal gaps 25, which causes regeneration of the elastic return stress K. With the tilting of the lever 1 then being continued, the spindle 17 becomes engaged at the end of its travel, in the profiles consisting of the gaps 25 of the cams 23. The end-of-travel stop is then ensured by the contact of the cable-holder spindle 9 on the stopping profiles 11b of the base 3 (FIG. 5). In the maximum actuation position, the cables 7 form with the plane P, parallel to the plane of fastening of the base 3 on the body, the angle α as already explained.

In the intermediate position, in which the locking spindle 17 is held in the notches 27, the brake is unlocked by discharging the lever 1 with a smaller force than on controls with toothed sectors and pawls, by actuating the end 18a of the push bar 18 so as to release the spindle 17 of the notches 27, before lowering the lever 1 back to the rest position. In the maximum actuation position, it is sufficient to actuate the end 18a of the push bar 18 to release the spindle 17 from the terminal profiles 25, and to push the lever 1 back towards its rest position without having to discharge the contact force.

The push bar 18 subjected to the return force K, and sliding inside the lever 1, thus provides a first holding of the brake in the intermediate actuation position. In the maximum actuation position, the fact that the direction of the force of the cables 7 passes slightly above the geometrical axis of the articulation spindle 2, as well as the placement of the spindle 9 in abutment on the profiles 11b, ensures self-holding of the brake in this position, the spindle 17 engaged in the notches 25 ensuring additional safety locking. In this position, unlocking is obtained without any force other than a force opposite the stress K on the push bar 18, simple pressure on the handle 28 being then sufficient to release the brake.

The movement of the spindle 17 of the push bar 18 on the cam profiles 23, in the notches 25 of the base 3, in cooperation with the oblong slots 22 by translation therein, ensures a safety self-locking function of the brake, making it possible to prevent any accidental release.

The range of tension available in the cables 7 can be preadjusted to the desired values by altering the dimensioning of the constituent parts (distance between the articulation spindle 2 and the linkage spindle 9, allowed angle of displacement of the lever 1, etc.)

The intermediate position of the lever is advantageous in allowing the user sufficient actuation in most cases of use, by means of small angular displacement of the control. The brake according to the invention requires for its operation only a limited force on the part of the user, less than approximately 18 daN at the level of the lever 1. In fact, as the tension in the cables 7 is increased the distance separating these cables from the rotation spindle 2 decreases, by virtue of the relative positioning of the spindle 2 of the linkage spindle 9 and of the ends 7a of the cables 7 beyond the spindle 2.

The invention is not limited to the embodiment described, and may include various alternative embodiments, it thus being possible for the base 3 to be produced in a manner different from that shown, with, for example, different cam profiles 23.

It should be noted that, during operation of the lever 1, the spindle 9 turns on itself. The length of this spindle 9 is determined so as to be sufficient for passage and especially displacement of the cables 7, on either side of the base 3. The cables 7 translate in their sheaths 16 whilst executing a rotational movement about the point O which tends to reduce the distance separating them from the rotation spindle 2. The translation-rotation movement of the cables 7 creates a variable force reduction ratio which considerably decreases the forces for actuating and releasing the brake.

As a variant, the linkage part 9 may be designed to allow attachment of a single cable at the rear of the control. The linkage between the end-piece of the cable and the spindle 9 is then produced by means of a U-shaped crevice whose ends are attached on the spindle 9, passing through the guide channels 8, the central part of which carries the system (screw-nut, for example), for adjusting the tension in the cable. This embodiment of the brake operates in a manner similar to the preceding one and has the same technical advantages, the U-shaped crevice and the end of the cable executing the same translation-rotation movements as the cables of the preceding embodiment. Furthermore, in the absence of requirement for safety locking in certain cases of use, it is possible to produce a brake according to the invention which is simplified by the elimination of the push bar 18, of the spring 19 and of the spindle 17.

We claim:

1. A parking brake mechanism for a vehicle, said vehicle having a chassis, said parking brake mechanism having a base (3) designed to be solidly attached with the chassis of the vehicle, said parking brake mechanism comprising a lever articulated onto an articulation spindle wherein said articulation spindle is integral with said base, wherein said lever is connected to at least one actuation cable (7), said at least one cable entering said base at a first end of said base, said parking brake mechanism further including means for locking said lever in a predetermined angular position, wherein said lever further includes a linkage element (9) for linkage with an end (7a) of said at least one cable, said base (3) being profiled so as to form a ramp (11) for limiting the displacement of said linkage element during operations of the lever, said ramp being limited by a stop (11b) for retaining said lever in a raised brake actuated position, said ramp positioned on said base at a second position distant from said first end of said base said linkage element offset from said articulation spindle such that said end of said at least one cable translates in an arched path as said lever is articulated from a rest position to said actuated position, said articulation spindle at all times mechanically disposed between said linkage element and said first end of said base, said at least one cable lying along a centerline bisecting said articulation spindle and said linkage element when said lever is in said actuated position.

2. A parking brake mechanism according to claim 1, further including means for adjusting the tension of said at least one cable, wherein said adjusting means comprises a compensator (12) combined with a screw (13)-nut (14) system, said adjusting means mounted on said base.

3. A parking brake mechanism according to claim 1, wherein said locking means comprises a locking spindle (17) fixed to a first end of a push rod (18), said push rod slidingly mounted inside said lever and subject to an elastic return stress (K), said locking means further comprising a cam (23) for bearing said locking spindle, said cam having first and second ends, said cam and said locking spindle disposed within said base (3), said lever having oblong slots (22) for guiding and translating said locking spindle (17) when said lever is articulated between said rest and said actuated positions, said first and second ends (26, 25) of said cam (23) respectively defining a rest and an actuated position of said push rod, wherein said elastic return stress (K) of said push rod urges said locking spindle against said cam.

4. A parking brake mechanism according to claim 3, wherein said cam includes a notch (27) lying intermediate said first and second ends and adapted to receive said locking spindle (17) and thereby define an intermediate position of said lever (1) said intermediate position lying between said rest and said actuated positions.

5. A parking brake mechanism according to claim 1, wherein said linkage element lies below said articulation spindle when said lever is in said rest position and wherein said linkage element lies above said articulation spindle when said lever is in said actuated position, and wherein said at least one cable exerts a tensioning force resisting articulation of said lever from said rest position toward said actuated position, and wherein, once said lever is in said actuated position, said tensioning force urges said linkage element against said ramp stop thereby urging said lever to remain in said actuated position.

6. A parking brake mechanism according to claim 3, wherein said lever includes a support, and wherein said push rod (18) houses a longitudinal spring (19) which bears on said support (21), said spring generating said elastic return stress (K).

\* \* \* \* \*